US007904064B2

(12) United States Patent
Frank et al.

(10) Patent No.: US 7,904,064 B2
(45) Date of Patent: Mar. 8, 2011

(54) METHODS AND SYSTEMS FOR TARGETED DELIVERY OF INFORMATION BASED ON CURRENT LOCATION OF WIRELESS DEVICE

(75) Inventors: Scott M. Frank, Dunwoody, GA (US); John P. Ruckart, Atlanta, GA (US)

(73) Assignee: AT&T International Property I, LP, Reno, NV (US)

( * ) Notice: Subject to any disclaimer, the term of this patent is extended or adjusted under 35 U.S.C. 154(b) by 820 days.

(21) Appl. No.: 11/868,768

(22) Filed: Oct. 8, 2007

(65) Prior Publication Data
US 2008/0182564 A1 Jul. 31, 2008

Related U.S. Application Data

(63) Continuation-in-part of application No. 11/700,619, filed on Jan. 31, 2007.

(51) Int. Cl.
*H04M 3/42* (2006.01)
(52) U.S. Cl. .................................. 455/414.2; 455/456.1
(58) Field of Classification Search ............... 455/414.2, 455/456.1
See application file for complete search history.

(56) References Cited

U.S. PATENT DOCUMENTS

| 6,374,182 | B2 * | 4/2002 | Bechtolsheim et al. ....... 701/209 |
| 7,395,149 | B2 * | 7/2008 | Matsumoto et al. .......... 701/207 |
| 2002/0091568 | A1 | 7/2002 | Kraft et al. |
| 2003/0026231 | A1 | 2/2003 | Lazaridis et al. |
| 2003/0212996 | A1 | 11/2003 | Wolzien |
| 2004/0198396 | A1 | 10/2004 | Fransioli |
| 2007/0150516 | A1 | 6/2007 | Morgan et al. |
| 2007/0239348 | A1 * | 10/2007 | Cheung .......................... 701/200 |
| 2008/0153513 | A1 | 6/2008 | Flake et al. |
| 2008/0167801 | A1 * | 7/2008 | Geelen et al. ................. 701/201 |

* cited by examiner

*Primary Examiner* — Barry W Taylor
(74) *Attorney, Agent, or Firm* — Myers Bigel Sibley & Sajovec, P.A.

(57) ABSTRACT

Methods and apparatus are disclosed for delivering targeted information to a mobile wireless device based on proximity of the wireless device to a given destination location. The information may include travel or routing information directing the user of the mobile device to the destination location, and other information concerning the sponsor of a destination. The travel information may be tailored to the mode of locomotion inferred from movement information determined for a mobile wireless device carried by the user.

16 Claims, 3 Drawing Sheets

METHODS AND SYSTEMS FOR TARGETED DELIVERY OF INFORMATION BASED ON CURRENT LOCATION OF WIRELESS DEVICE

CROSS-REFERENCE TO RELATED APPLICATION

This is a continuation-in-part of application Ser. No. 11/700,619 filed Jan. 31, 2007, which is incorporated herein by reference.

FIELD OF THE INVENTION

This application relates in general to delivering information to wireless devices, and more particularly relates to improved methods and systems for delivering targeted information to mobile wireless devices.

BACKGROUND

Targeted delivery of information to mobile wireless devices is a promising technology that is still developing. Such mobile wireless devices may include cell phones and personal digital assistants (PDAs), and the messages can be in the form of SMS, HTML, IM, email, or other formats now in use or later adopted. The concept of targeted marketing is that consumers and others can be reached on their wireless devices by advertisements or other messages that are targeted and specific to a given location. For instance, if a consumer is traveling near a coffee shop, he or she could receive an advertisement on their cell phone alerting them of a nearby coffee shop and perhaps including a promotional coupon or code as an inducement to visit that establishment However, the message may include only a street address or map to the coffee shop, which is not very persuasive or practical, for example, when the consumer is driving and is not able to safely consult a map on the small screen of a cell phone or PDA. Furthermore, an advertisement that recommends a coffee shop "in your area" is not as meaningful as an advertisement that is targeted to the particular user of a mobile wireless device.

SUMMARY

Stated in general terms, a system according to disclosed embodiments receives the current geographic location of a mobile wireless device and determines whether that current location bears a predetermined relation to the geographic location of at least one given destination. If the relation is determined to exist, a message is produced and delivered to the wireless device. That message may include destination or travel information for directing the user of the wireless device for travel to a destination sponsoring the message. Alternatively, the message may include an embedded link inviting the user to click for directions, a map, store details, and other information concerning a sponsoring destination. The information in either case may contain routing information advising the user of a preferred or recommended route from the current location of the wireless device to the certain destination.

Stated in somewhat more detail, embodiments may operate to determine or infer the mode of locomotion of a user carrying a mobile wireless device and tailor the travel information to that mode of locomotion. For example, a person determined to be traveling by automobile must obey road directions intended for motorists, one instance being the designated direction of travel along a one-way street. A pedestrian, however, usually can disregard travel restrictions unique to vehicle traffic; walking the "wrong" way along the sidewalk of a one-way street is not usually forbidden or dangerous. For further example, pedestrian travel is not permitted along certain roads, such as expressways or interstate highways. By inferring the nature of locomotion, embodiments of the present invention have the ability to provide customized travel directions customized to the particular user, making it easier for those users to visit the sponsoring source of a message.

Location information of the mobile wireless devices may be obtained by any suitable technique including techniques known in the art, as discussed below.

Other systems, methods, and/or computer program products according to embodiments will be or become apparent to one with skilled in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
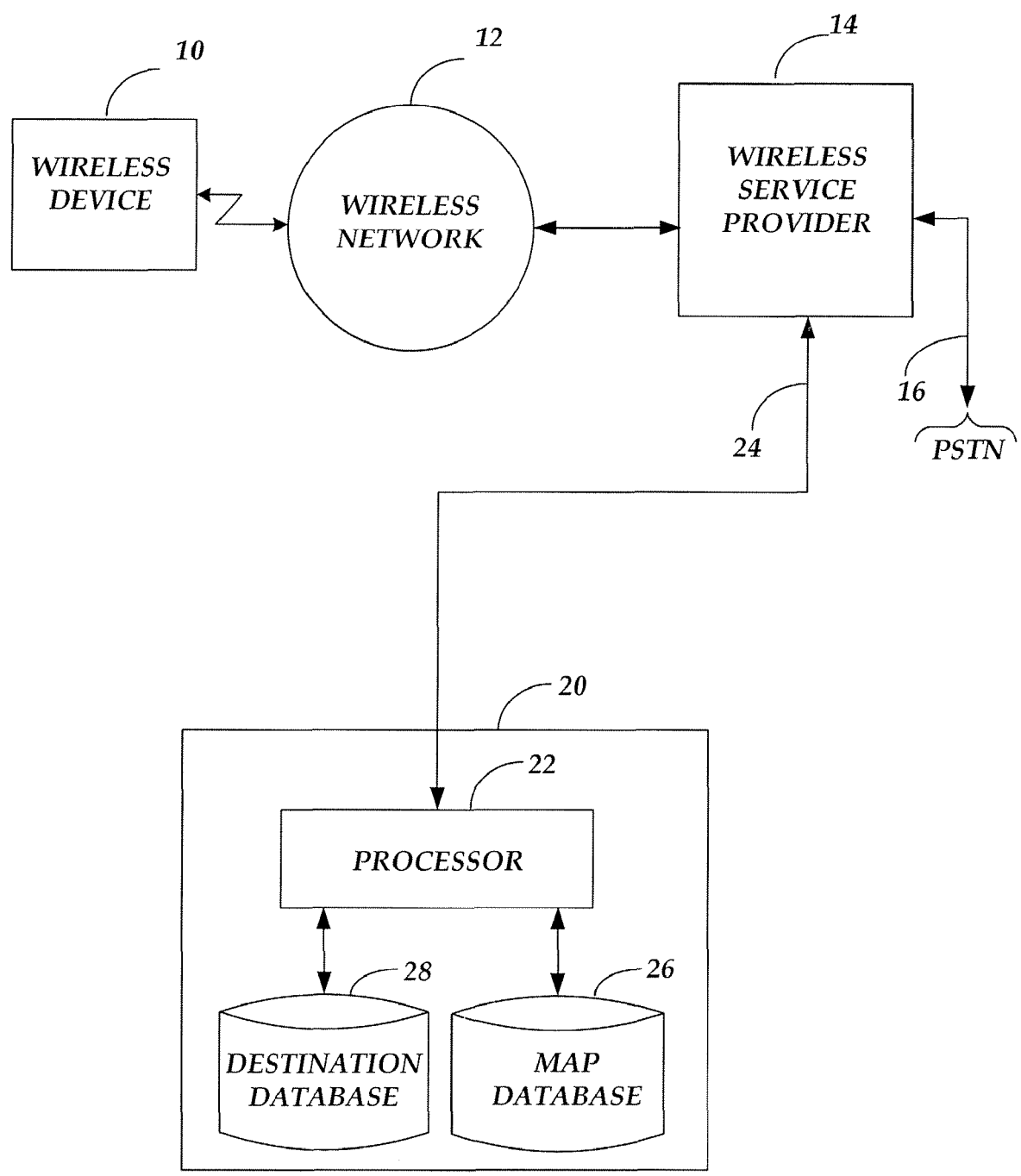
FIG. 1 is a functional block diagram showing certain elements of a system for delivering targeted information to a mobile wireless device according to a disclosed embodiment.

FIG. 1 shows in functional terms an apparatus according to a disclosed embodiment for targeted delivery of information based on the current geographic location of at least one wireless device and, by extension, the current geographic location of the person carrying that wireless device. The mobile wireless device in that disclosed embodiment is indicated generally at 10, and it will be understood that those wireless devices 10 may be cell phones, PDAs equipped for radio communication, or any other mobile wireless device operative for radio communication with a central location or service provider for such wireless devices. It will also become apparent to those skilled in the art that embodiments may monitor the geographic locations and movements of more than one wireless device 10 and provide targeted information to those plural wireless devices 10 relative to plural destinations at separate geographical locations.

A wireless network 12 is in radio communication with the wireless device 10. Where the wireless device 10 comprise a cell phone, it will be understood that the wireless network 12 comprises a number of cell sites for radio communication with the wireless device 10 and other mobile wireless devices. The wireless network 12 in the depicted embodiment is operated by a wireless service provider 14, which those skilled in the art will understand as including one or more mobile switching centers each of which may serve more than one cell site. The wireless service provider 14 establishes communication between the wireless device 10 through the wireless network 12, or between the wireless device 10 and one or more landline phones by the interconnection 16 with the public switched telephone network (PSTN) or with other wired or wireless communications networks such as the Internet and Voice Over Internet Protocol (VOIP).

An information service provider 20 according to the disclosed embodiment provides monitoring and information delivery services for participating subscribers desiring to deliver targeted information to users of mobile wireless devices 10 and receives information from the wireless service provider 14 concerning the identities and geographic locations of wireless devices 10. It should be understood that the services and operations of the information service provider 20 may be provided by the wireless service provider 14 or by an entity separate from the wireless service provider 14, although the two service providers 14 and 20 are shown functionally separated in FIG. 1. In either case, the information service provider 20 provides monitoring and targeted message delivery functions for subscribers to the mobile information service, based on information provided to the information service provider 20 by those subscribers. Typical subscribers to the present targeted message delivery services might be retail providers of goods or services in general; the example of coffee shops mentioned herein is somewhat exemplary of a relatively low-cost provider whose products might be considered as impulse purchases appealing to passers-by, although no limitation regarding the nature of subscribers or subscriber activities should be inferred from the examples given herein.

Each such subscriber will have entered into an arrangement with the information service provider 20 whereby the information service provider 20 receives geographic location information about the mobile wireless devices 10 from the wireless service provider 14 and, in response to that geographic location information, delivers messages to the wireless devices 10. Those messages are customized to the products or services provided by the subscribers and deemed likely to interest users of wireless devices 10 within some predetermined proximity to at least one location of a particular subscriber. The messages, which may be in the form of SMS, HTML, email, IM, or any other form of text message delivery compatible with wireless devices 10 as will be known to those skilled in the art, include a field populated by variable information such as the current location of the wireless device 10, distance and travel instructions from that current location to the location of the subscriber location, nearby landmarks, or other information to attract and assist the user of the wireless device 10. That variable-information field is populated by an application that queries the wireless service provider 14 for the current geographical location of the wireless device 10 and, from that location information, may determine the current speed and direction of travel of the wireless device 10 and process that current-location information against reference information to determine the proximity, in distance and projected travel time, to the closest location of the subscriber and travel directions to that location. The reference information may include detailed geographic cartographic information sufficient to provide step-by-step travel instructions from a known starting location (typically the current location of the wireless device 10) to a known destination location such as a subscriber location. Such electronic cartographic mapping services are known to those skilled in the art, one example being the MapQuest® web map service.

The information service provider 20 includes a processor 22 operatively communicating at 24 with the wireless service provider 14, a destination database 28 operatively connected to the processor 22 for receiving and storing information identifying the locations and other information of participating subscribers, and a map information database 26 containing the cartographic information relevant to the locales of likely interest to customers of the subscribers. Information concerning the geographic locations of the wireless device 10 is provided by the wireless service provider 14 and may be obtained by any technique known in the art. Such geographic location techniques currently include the global positioning system (GPS) relying on satellite information that can be received by a GPS-enabled wireless device 10. Other current techniques for locating wireless devices 10 include, without limitation, time-difference-of-arrival measurement based on signals transmitted by the wireless devices 10 and received at multiple radio towers of the wireless network 12. Techniques for obtaining and processing geographic location information of cell phones and other wireless devices 10 are known to those skilled in the art. See, for example, U.S. Pat. No. 7,110,749, assigned to the assignee of the present invention. Whatever the source, the geographic-location information for the wireless device 10 is supplied to the processor 22 of the information service provider 20 through any suitable data link 24 including wireless or wireline connections and using Internet Protocol (IP) or any other suitable data-transfer technique.

The processor 22 of the information service provider 20 is programmed to compare the geographic location information received for the wireless device 10 with the geographic location of at least one subscriber so as to determine whether a predetermined relation exists between the locations of the wireless device 10 and a subscriber location, and to produce a message for delivery to the wireless device 10 with suggested destination information if the predetermined relation exists. That message itself may indicate the location of one or more coffee shops (in the present example) and may contain information including the preferred route for travel to that destination location based on the user's current location. Alternatively, the message may include at least one embedded link for the user to click or otherwise select, offering user options for selecting the destination location closest to the current location of the user's wireless device 10, in response to which the information service provider 20 generates a message containing directions to the subscriber location, store details, or other information of possible interest to the user. Another option is to have the information service provider 20 populate the location field of the message with the name of the street, neighborhood, direction, and/or speed of the wireless device 10.

Given the current location and calculated velocity of the wireless device 10, the service provider 20 may be programmed to infer whether the movement patterns of that wireless device 10 are consistent with travel in a vehicle or as a pedestrian, and to determine travel information in accord with that determination. For example, determining the velocity of the wireless device 10 at more than a predetermined walking speed will support an inference that the user carrying that wireless device 10 is in a vehicle, while a user moving at a walking speed is likely traveling on foot. Detected stop-and-go movement of the wireless device 10 may indicate that the user is moving in traffic, particularly where the intervals of "go" movement exceed a likely walking speed.

Figure 2:
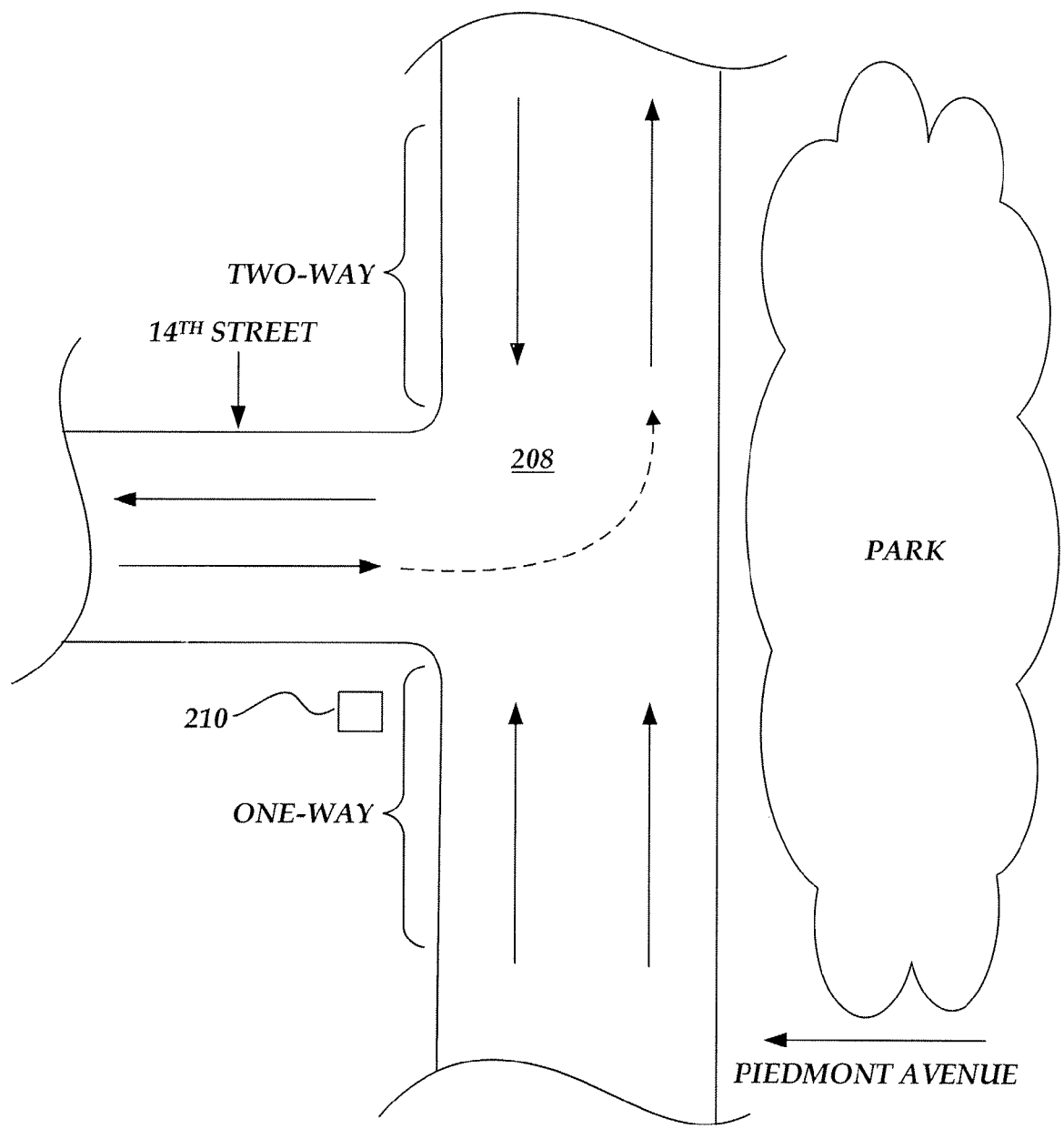
FIG. 2 is a fragmentary illustration of a street map showing an example for which customized travel directions may be supplied in response to a user's mode of locomotion, according to a disclosed embodiment.

In response to inferring the user's mode of travel, the process may produce travel directions specific to that mode of travel. Referring to FIG. 2 for an example according to one disclosed embodiment, the street Piedmont Avenue is one-way northbound until that street intersects at 208 with $14^{th}$ Street, which allows two-way traffic. However, Piedmont Avenue is two-way north of the intersection 208. It follows that an eastbound motorist on $14^{th}$ Street cannot legally turn right to reach a coffee shop 210 on Piedmont Avenue immediately south of the intersection 208. However, a pedestrian on $14^{th}$ Street, walking toward the intersection 208, can turn right at that intersection and head toward the coffee shop 210. Assuming the detected movement pattern of the wireless device 10 heading east on 14$^{th}$ Street meets predetermined criteria programmed for the processor 22 (FIG. 1) of the information service provider 20 to infer whether or not that wireless device 10 is vehicle-borne, the processor 22 may be programmed to produce travel instructions consistent with that determination. Those travel instructions to the pedestrian user of the wireless device 10 may, for example, include a map illustrating a right-turn at the intersection 208 and highlighting the location of the coffee shop 210 immediately south of that intersection. However, travel instructions to an inferred vehicle-borne user would not include a right turn at the intersection 208 and might instead contain a specific warning that the driver must turn left at that intersection, where 14$^{th}$ Street dead-ends at the intersection. If the participating subscriber has another coffee shop reachable on Piedmont Avenue within some predetermined distance north of the intersection 208, the message generated to the motorist may also include that information along with instructions for reaching that other location.

Figure 3:
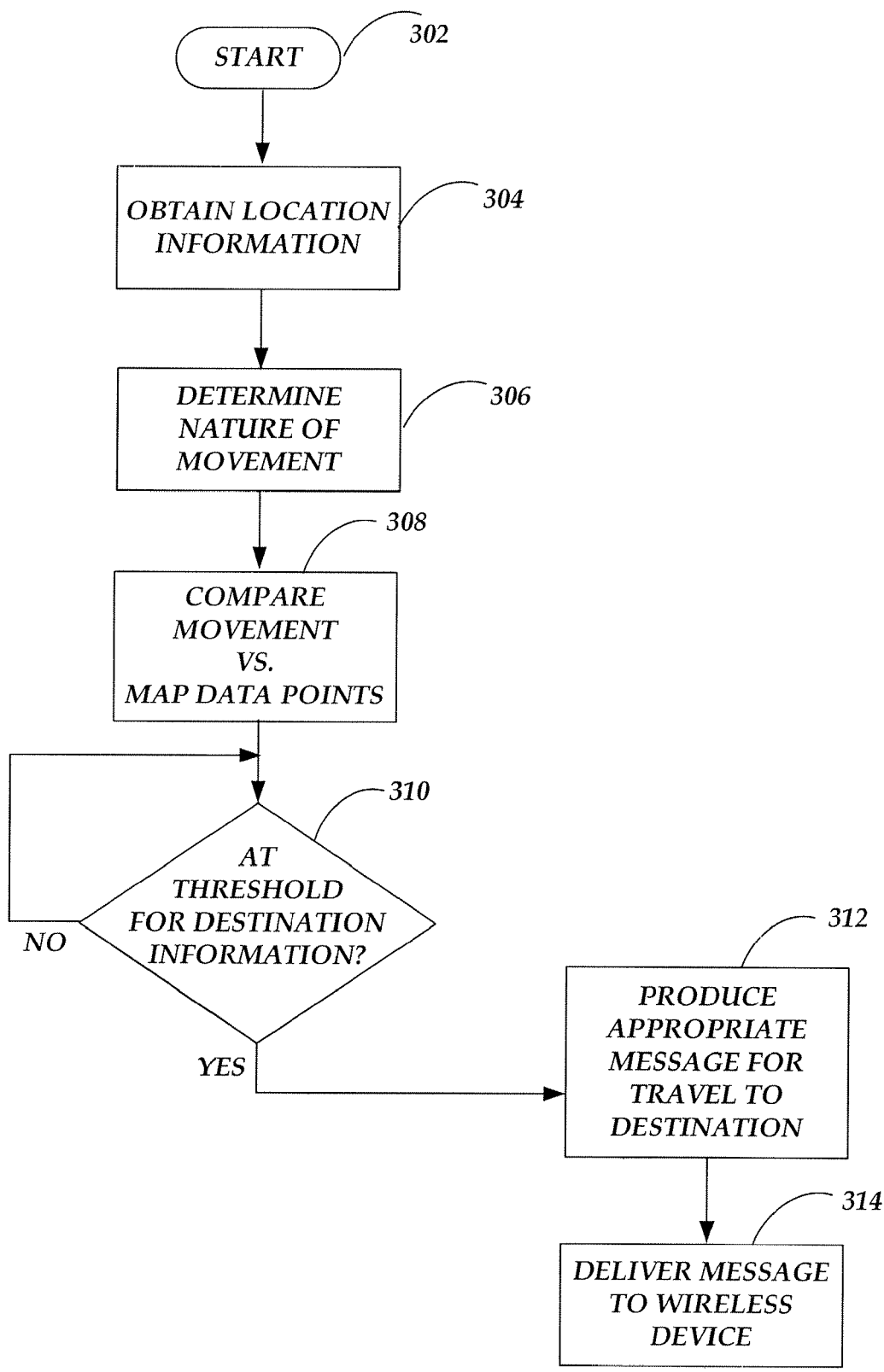
FIG. 3 is a flow chart illustrating operation of a disclosed embodiment.

FIG. 3 illustrates an example of targeted delivery of information to the wireless device 10 according to the embodiment of FIG. 1. At the start 302 of the process illustrated in FIG. 3, it is assumed that a subscriber or account holder of the information service has registered, with the information service provider 20, at least one location with a known geographic location. That registration would typically include one or more messages for delivery to prospective customers carrying mobile wireless devices 10, and a link with a source of cartographic information able to generate travel instructions to the subscribing location based on selected parameters and determined geographic locations of the wireless device 10. Such parameters could include, for example, the maximum desired geographic separation or relative velocity between a determined current location of the wireless device 10 and the subscriber location. Furthermore, the subscriber may provide time- or date-relevant information pertaining to one or more locations, dates, or times for providing special offers to prospective customers of the subscriber. That information is supplied to the information service provider 20 by a subscriber and is stored on the destination database 28 by the processor 22.

Referring again to FIG. 3, location information is obtained at 304 from the participating wireless device 10. That location information may be obtained at periodic intervals, as is known in the art. Using the obtained location information, the processor 22 of the information service provider 20 determines at 306 the nature of movement of the user, e.g., in a vehicle or on foot as previously mentioned, and compares that inferred locomotion at 308 with map data obtained from the map database 26 to compare the current location of the wireless device 10 with the geographical location of at least one participating location previously stored in the destination database 28. That comparison 308 continues unless the comparison shows at 310 that the wireless device 10 has reached a predetermined threshold point for sending a message from the participating subscriber and targeted to the user of the wireless device 10. In that latter case, the processor 22 at 312 generates an appropriate message for travel from the current location of the wireless device 10 to the subscriber location and at 314 forwards that message to the wireless service provider 14 (FIG. 1) for delivery to the wireless device 10. The threshold point may be a function of the remaining distance between the wireless device 10 and the subscriber location, or may be a function of estimated remaining travel time to the subscriber location at the current speed of the wireless device 10.

It should also be understood that the foregoing relates only to disclosed embodiments of the present invention and that numerous changes and modifications therein may be made without departing from the spirit and scope of the invention as defined in the following claims.

What is claimed is:

1. A method for targeted delivery of a message based on a current geographic location of a wireless device, comprising:
receiving current location information identifying the current geographic location of the wireless device;
determining whether the current geographic location bears a predetermined relation to a geographic location of a certain destination;
in response to determining that the predetermined relation exists, determining destination information for travel from the current geographic location to the certain destination, wherein the destination information includes a route for traveling from the current geographic location of the wireless device to the certain destination, comprising:
determining from the current location information an inference whether a user carrying the wireless device is moving on foot or is moving with a vehicle;
determining a first set of destination information in response to determining the inference that the user is moving with a vehicle; and
determining a second set of destination information in response to determining the inference that the user is a pedestrian,
wherein the destination information is determined according to an inferred locomotion of the user carrying the wireless device; and
producing for delivery to the wireless device the message which includes the destination information to arrive at the certain destination.

2. The method of claim 1, wherein:
the current location information comprises the current geographic location and a speed of the wireless device; and
determining the destination information comprises determining a route for travel from the current geographic location to the certain destination as a function of the current geographic location and the speed of the wireless device, so as to produce the destination information to the wireless device to enable a user carrying the wireless device to reach the certain destination within a predetermined time.

3. The method of claim 1, further comprising:
determining the first set of destination information to follow certain rules of travel for vehicles along the route; and
determining the second set of destination information to disregard the rules of travel for vehicles along the route, so that the second set of destination information for the user who is the pedestrian is not constrained by the rules of travel for vehicles.

4. The method of claim 1, wherein:
the message for delivery to the wireless device includes the current geographic location of the wireless device with respect to the geographic location of the certain destination.

5. The method of claim 1, wherein:
the certain destination comprises one of plural certain destinations each having a unique geographic location; and the message delivered to the wireless device includes the current geographic location of the wireless device with respect to the unique geographic location for each of the plural certain destinations.

6. The method of claim 1, wherein:
the certain destination comprises one of plural certain destinations each having a unique geographic location;
the message delivered to the wireless device includes the current geographic location of the wireless device with respect to the unique geographic location for each of the plural certain destinations; and
further comprising receiving a second message from the wireless device indicating a selection by the user of one certain destination of the plural certain destinations;
determining a route for travel from the current geographic location to the one certain destination as a function of the current location information of the wireless device; and
delivering to the wireless device the message including the route for travel from the current geographic location to the one certain destination.

7. The method of claim 1, wherein the message produced for delivery to the wireless device includes an embedded link selectable at the wireless device to provide other information to the wireless device.

8. A system for targeted delivery of a message based on a current geographic location of a wireless device, comprising:
means for receiving current location information identifying the current geographic location of the wireless device;
means for determining whether the current geographic location bears a predetermined relation to a geographic location of a certain destination;
means for determining destination information for travel from the current geographic location to the destination, comprising:
means for determining from the current location information an inference whether a user carrying the wireless device is moving on foot or is moving with a vehicle;
means for determining a first set of destination information in response to determining the inference that the user is moving with a vehicle; and
means for determining a second set of destination information in response to determining the inference that the user is a pedestrian,
wherein the destination information is determined according to an inferred locomotion of the user carrying the wireless device; and
means for producing for delivery to the wireless device the message which includes the destination information to arrive at the certain destination.

9. The system of claim 8, wherein:
the current location information comprises the current geographic location and speed of the wireless device; and
the means for determining the destination information operates to determine a route for travel from the current location to the certain destination as a function of the current geographic location and speed of the wireless device, so as to deliver the destination information to the wireless device to enable a user carrying the wireless device to reach the certain destination within a predetermined time.

10. The system of claim 8, wherein:
the means for determining the first set of destination information operates to follow certain rules of travel for vehicles along the route; and
the means for determining the second set of destination information operates to disregard the rules for vehicles along the route of travel, so that the second set of destination information for the user who is the pedestrian is not constrained by the rules of travel for vehicles.

11. A computer readable medium having stored thereon instructions which, when executed by a processor, causes the processor to perform targeted delivery of information based on a current geographic location of a wireless device and comprising:
receiving current location information identifying the current geographic location of the wireless device;
determining whether the current geographic location bears a predetermined relation to a geographic location of a certain destination;
in response to determining that the predetermined relation exists, determining destination information for travel from the current geographic location to the destination, comprising:
determining from the current location information an inference whether a user carrying the wireless device is moving on foot or is moving with a vehicle;
determining a first set of destination information in response to determining the inference that the user is moving with a vehicle; and
determining a second set of destination information in response to determining the inference that the user is a pedestrian,
wherein the destination information is determined according to an inferred locomotion of the user carrying the wireless device; and
producing for delivery to the wireless device the message which includes the destination information to arrive at the destination.

12. The computer readable medium of claim 11, wherein the destination information includes a route for traveling from the current location of the wireless device to the certain destination.

13. The computer readable medium of claim 11, wherein:
the current location information comprises the current geographic location and speed of the wireless device; and
determining the destination information comprises determining a route for travel from the current geographic location to the certain destination as a function of the current geographic location and the speed of the wireless device, so as to deliver the destination information to the wireless device to enable a user carrying the wireless device to reach the certain destination within a predetermined time.

14. The computer readable medium of claim 11, further comprising:
determining the first set of destination information to follow certain rules of travel for vehicles along the route; and
determining the second set of destination information to disregard the rules of travel for vehicles along the route, so that the second set of destination information for the user who is the pedestrian is not constrained by the rules of travel for vehicles.

15. The computer readable medium of claim 11, wherein:
the certain destination comprises one of plural certain destinations each having a geographic location; and
the message for delivery to the wireless device includes the current geographic location of the wireless device with respect to the geographic locations of the plural destinations.

16. The computer readable medium of claim 11, wherein:
the certain destination comprises one of plural certain destinations each having a unique geographic location;
the message delivered to the wireless device includes the current geographic location of the wireless device with respect to the unique geographic location for each of the plural certain destinations; and further comprising receiving a second message from the wireless device indicating a selection by the user of one certain destination of the plural certain destinations;

determining a route for travel from the current geographic location to the one certain destination as a function of the current location information of the wireless device; and delivering to the wireless device the message including the route for travel from the current geographic location to the one certain destination.

\* \* \* \* \*

UNITED STATES PATENT AND TRADEMARK OFFICE
CERTIFICATE OF CORRECTION

| | | |
|---|---|---|
| PATENT NO. | : 7,904,064 B2 | Page 1 of 1 |
| APPLICATION NO. | : 11/868768 | |
| DATED | : March 8, 2011 | |
| INVENTOR(S) | : Scott M. Frank and John P. Ruckart | |

It is certified that error appears in the above-identified patent and that said Letters Patent is hereby corrected as shown below:

Title Page, Item (73) Assignee should read
--AT&T Intellectual Property I, LP--

Signed and Sealed this
Thirty-first Day of May, 2011

David J. Kappos
*Director of the United States Patent and Trademark Office*